United States Patent
Ichikawa (10) Patent No.: US 6,669,305 B2
(45) Date of Patent: Dec. 30, 2003

(54) WHEEL CAP STRUCTURE

(75) Inventor: Takashi Ichikawa, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 10/199,128

(22) Filed: Jul. 22, 2002

(65) Prior Publication Data

US 2003/0015910 A1 Jan. 23, 2003

(30) Foreign Application Priority Data

Jul. 23, 2001 (JP) ........................................ 2001-220995

(51) Int. Cl.[7] .............................. B60B 7/04; B60B 7/00; B60B 19/10
(52) U.S. Cl. ................................ 301/37.28; 301/37.42; 301/6.3; 301/37.106
(58) Field of Search ........................ 301/37.101, 37.26, 301/37.28 I, 37.39, 37.42, 6.3, 37.102, 37.27, 37.106, 37.43

(56) References Cited

U.S. PATENT DOCUMENTS

| | | | | |
|---|---|---|---|---|
| 2,157,960 A | * | 5/1939 | Lyon | 301/37.34 |
| 2,237,164 A | * | 4/1941 | Rosenburg | 301/6.3 |
| 2,248,707 A | * | 7/1941 | Horn | 301/6.3 |
| 2,386,244 A | * | 10/1945 | Lyon | 301/37.106 |
| 2,998,105 A | * | 8/1961 | Lyon | 301/6.3 |
| 6,439,670 B1 | * | 8/2002 | Winters | 301/37.101 |
| 6,517,168 B1 | * | 2/2003 | Van Houten | 301/37.42 |

* cited by examiner

Primary Examiner—S. Joseph Morano
Assistant Examiner—Jason R. Bellinger
(74) Attorney, Agent, or Firm—Nixon Peabody, LLP (57) ABSTRACT

In a wheel cap structure of the present invention, a wheel cap is formed by, for example, a wheel cap main body and concealing portion pieces. The concealing portion pieces are engaged with and mounted to reverse surface sides of design holes formed in the wheel cap main body, and function to conceal a wheel portion, which includes punched holes of a steel wheel, such that the wheel portion cannot be seen from an exterior. Further, the concealing portion pieces are mounted such that gaps for cooling are formed between the concealing portion pieces and the wheel cap main body. Accordingly, a performance of cooling the steel wheel is ensured. Namely, the present invention provides the wheel cap structure in which, even if the design holes are made large, appearance of a vehicle is not deteriorated, and further, the performance for cooling the wheel is ensured.

9 Claims, 9 Drawing Sheets

WHEEL CAP STRUCTURE

BACKGROUND OF THE INVENTION

1. Field of the Invention

The present invention relates to a wheel cap structure which is mounted to a side surface of a wheel.

2. Description of the Related Art

Figure 8:
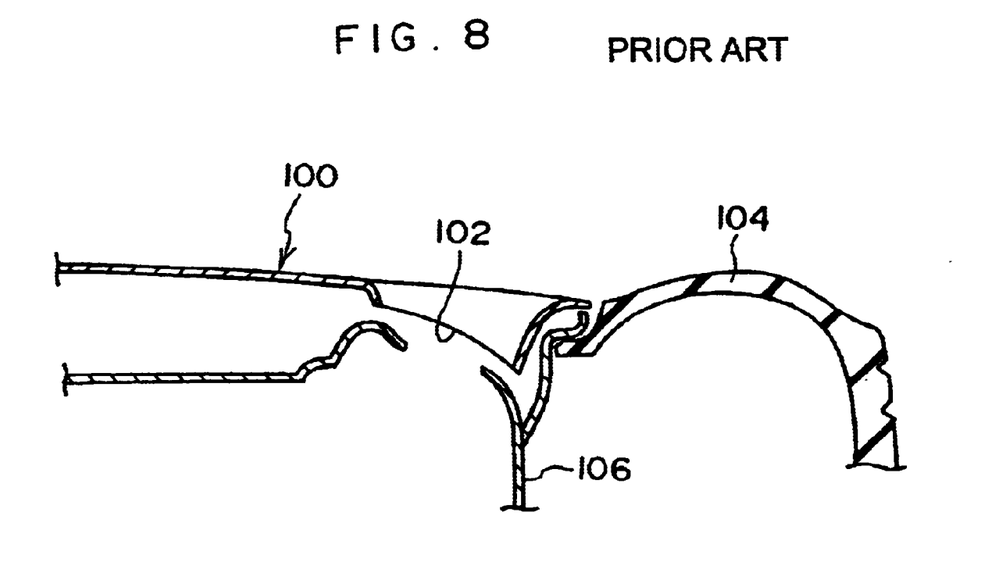
FIG. 8 is a longitudinal sectional view showing a state in which a wheel cap relating to a conventional example is mounted to a steel wheel.

Conventionally, the appearance of a vehicle has been improved by covering steel wheels with resin wheel caps. An overview of such a technique will be described hereinafter with reference to FIGS. 8 and 9. As shown in FIG. 8, substantially triangular design holes 102 are formed at predetermined intervals in the peripheral direction of a conventional wheel cap 100. These design holes 102 are elements which greatly influence the appearance of the vehicle. The design holes 102 cannot be eliminated as they are important elements for cooling a steel wheel 106 on which a tire 104 is mounted.

Figure 9:
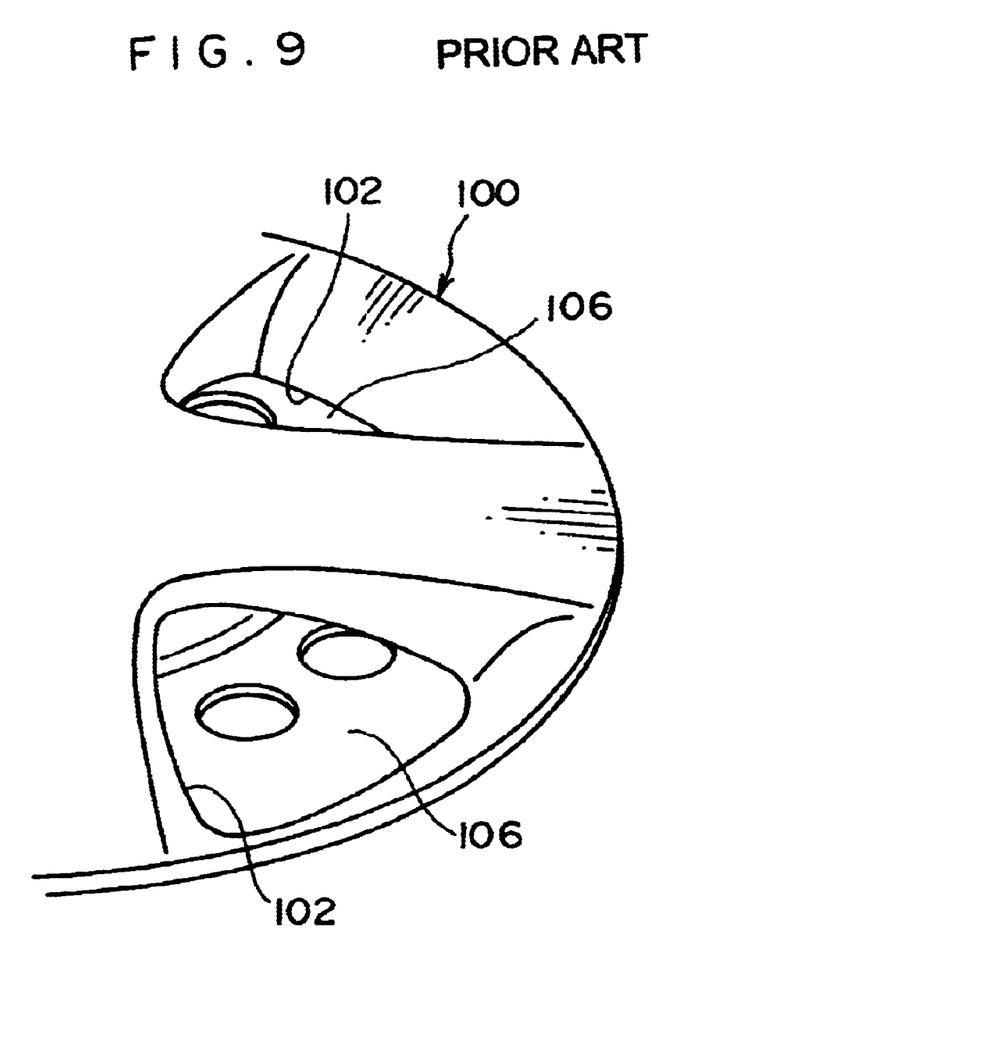
FIG. 9 is a perspective view showing a state in which the conventional wheel cap is mounted to a steel wheel, and is for explaining drawbacks of the conventional art.

Here, the designer is required to make the design holes 102 large to a certain extent in order to create a design which resembles the aluminum wheel. However, as shown in FIG. 9, if the design holes 102 are made large, the steel wheel 106 can be seen through the design holes 102, and a problem arises in that, conversely, the appearance of the vehicle is deteriorated.

SUMMARY OF THE INVENTION

In view of the aforementioned, an object of the present invention is to provide a wheel cap structure in which, even if the design holes are made large, the appearance is not deteriorated, and which can ensure the performance of cooling the wheel.

A first aspect of the present invention is a wheel cap structure comprising: a wheel cap main body mounted to a side surface of a wheel, and in which a plurality of design holes are formed in a peripheral direction of the wheel cap main body; and concealing portions provided respectively at opening portions of the design holes of the wheel cap main body, the concealing portions concealing a wheel portion beneath the design holes, and gaps for cooling, which allow air flow to/from a wheel, being formed between the concealing portions and the wheel cap main body.

A second aspect of the present invention is a wheel cap structure comprising: an outer side wheel cap main body forming one portion of a wheel cap main body, and in which a plurality of design holes are formed in a peripheral direction of the outer side wheel cap main body; and an inner side wheel cap main body forming another portion of the wheel cap main body and mounted to a side surface of a wheel, the outer side wheel cap main body being fit with and partially covering the inner side wheel cap main body, wherein the inner side wheel cap main body has: concealing portions which, in a state in which the outer side wheel cap main body is fit with and partially covers the inner side wheel cap main body, conceal, at positions corresponding to the design holes, a wheel portion beneath the design holes, and which form gaps for cooling between the concealing portions and the outer side wheel cap main body; and openings for cooling formed at positions which are different than the concealing portions, in a manner that the opening for cooling allows air flow to/from the wheel.

In accordance with the first aspect, in the state in which the wheel cap main body is mounted to the side surface of the wheel, the plurality of design holes which are formed in the peripheral direction of the wheel cap main body can be seen from the exterior. However, in the present invention, the concealing portions are provided at the opening portions of the respective design holes of the wheel cap main body. Thus, the wheel portion is not exposed to the exterior from the design holes. Accordingly, even if the design holes are made large, the appearance of the vehicle is not deteriorated.

Further, in the present invention, the gaps for cooling, which allow air flow to/from the wheel, are formed between the concealing portions and the wheel cap main body. Thus, even if the concealing portions are provided, the performance of cooling the wheel is ensured.

In accordance with the second aspect, the outer side wheel cap main body, which forms one portion of the wheel cap main body, is fit with and partially covers the inner side wheel cap main body, which forms the other portion of the wheel cap main body. As a result, an integrated wheel cap main body is formed. Then, the wheel cap main body which is in this state is mounted to the side surface of the wheel. In this mounted state, the plurality of design holes, which are formed in the peripheral direction of the outer side wheel cap main body, can be seen from the exterior. However, in the present invention, the concealing portions are provided at positions of the inner side wheel cap main body which positions correspond to the respective design holes. Thus, the wheel portion is not exposed to the exterior from the design holes. Accordingly, even if the design holes are made large, the appearance of the vehicle is not deteriorated.

Moreover, in the second aspect of the present invention, the gaps for cooling are formed between the concealing portions and the outer side wheel cap main body. Further, the openings for cooling, which allow air flow to/from the wheel, are formed in the inner side wheel cap main body. Thus, in spite of the provision of the concealing portions, the performance of cooling the wheel is ensured.

DETAILED DESCRIPTION OF THE PREFERRED EMBODIMENTS

First Embodiment

Hereinafter, a wheel cap 10 relating to a first embodiment will be described with reference to FIGS. 1 and 2. Note that this first embodiment corresponds to the embodiment of the present invention recited in claim 1.

Figure 1:
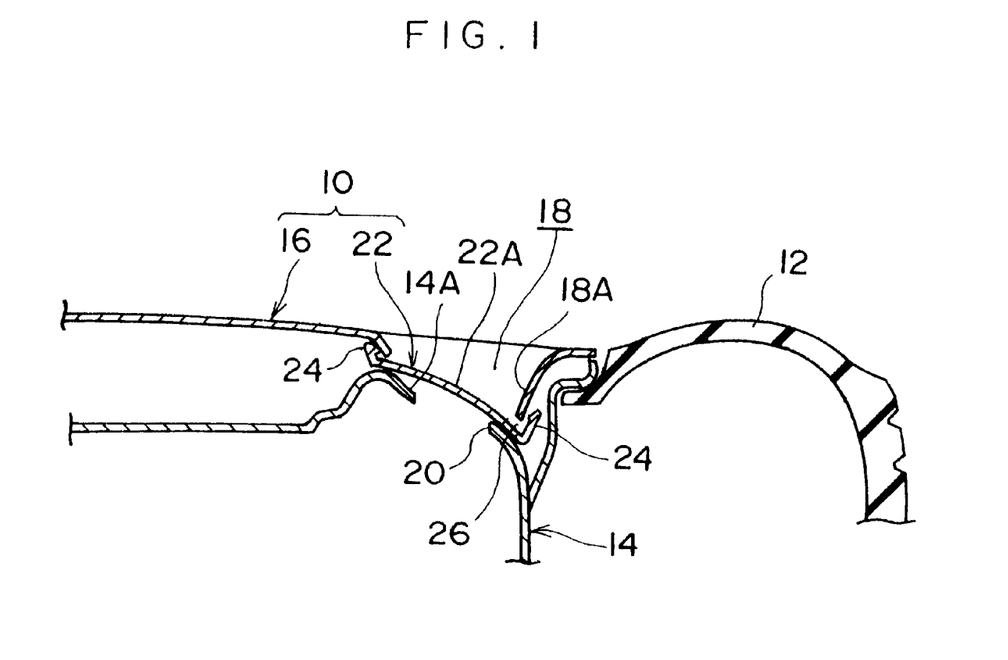
FIG. 1 is a longitudinal sectional view showing a state in which a wheel cap relating to a first embodiment of the present inventions is mounted to a steel wheel.

FIG. 1 is a longitudinal sectional view showing a mounted state of the wheel cap relating to the present first embodiment. FIG. 2 shows a state in which a main portion of the wheel cap has been disassembled to main pieces. As can be seen from FIGS. 1 and 2, the wheel cap 10 is mounted to the outer-side side surface of a steel wheel 14 which supports a tire 12. Note that the wheel cap 10 is formed of resin, and a plurality of engaging claws (not illustrated) are formed integrally with the wheel cap 10 at appropriate positions in the peripheral direction. The wheel cap 10 is mounted to the outer-side side surface of the steel wheel 14 by these engaging claws being elastically engaged at predetermined positions of the steel wheel 14.

Figure 2:
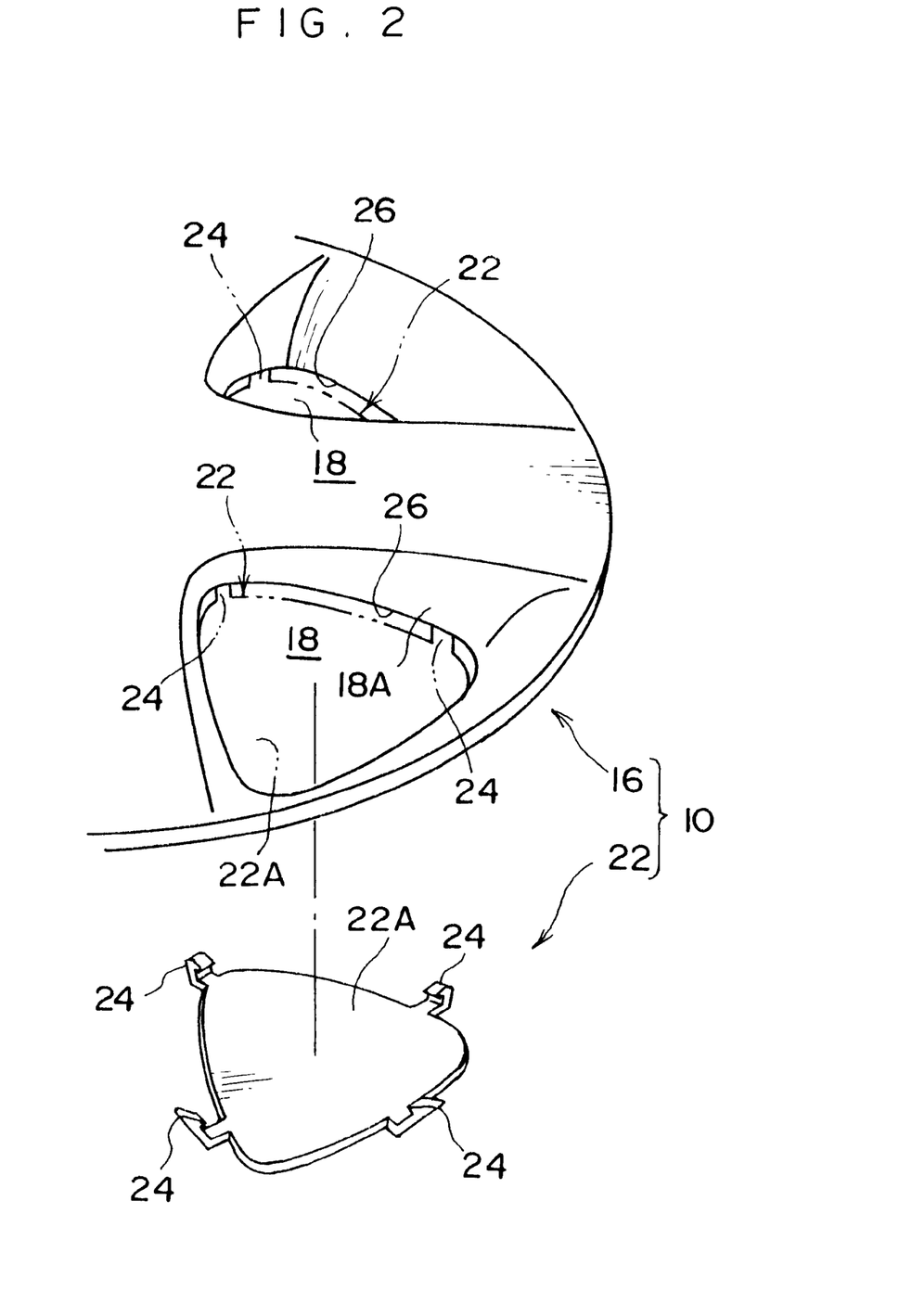
FIG. 2 is a perspective view showing a state in which a wheel cap main body shown in FIG. 1 and a cover to be mounted after are separated.

As shown in FIG. 2, the wheel cap 10 is provided with a wheel cap main body 16 formed in a substantially disc-shaped configuration. Substantially triangular design holes 18 are formed in the wheel cap main body 16 at predetermined intervals in the peripheral direction. With regard to the configurations of the design holes 18, the design holes 18 are formed in an arrangement such that the vertices thereof are directed toward the axial center of the wheel cap main body 16. Accordingly, when viewing the entire wheel cap 10, it is as if the design holes 18 of the same configuration are arranged radially.

On the other hand, circular punched holes 20 (see FIG. 1) are formed at predetermined intervals in the peripheral direction in the steel wheel 14 as well. The design holes 18 are formed to be rather large with respect to the punched holes 20. When a piece 22 to be mounted after, which will be described later, is not mounted to the design hole 18, about two of the punched holes 20 are exposed to the exterior at the central portion of the design hole 18.

The piece 22 to be mounted after, which is formed of resin and serves as a "concealing portion", is elastically mounted to each design hole 18 from the reverse surface side thereof. Specifically, the piece 22 which is to be mounted after (i.e., the concealing portion) is formed to be substantially triangular so as to substantially correspond to the configuration of the design hole 18. Engaging claws 24, which are formed in hook-like shapes, are formed integrally with the piece 22 to be mounted after, at predetermined positions of the peripheral portion thereof. Note that, in the present embodiment, the engaging claws 24 are formed at a total of four positions of the piece 22 to be mounted after, which four positions are the vertex located closest to the wheel center in the assembled state, the central point of the base opposing the vertex, and a point on each of the remaining legs of the triangle, at locations thereof nearer the base than the aforementioned vertex. However, the number of engaging claws 24 is arbitrary, and can be set such that, when the piece 22 to be mounted after is mounted to the reverse surface side of the design hole 18, this mounted state can be maintained stable.

The piece 22 to be mounted after is pushed against the wheel cap main body 16 from the reverse surface side of the wheel cap main body 16. While the four engaging claws 24 are elastically deformed, the engaging claws 24 are made to engage with the edge (rim) of a peripheral wall 18A of the design hole 18. In this way, the piece 22 to be mounted after is mounted to the reverse surface side of the design hole 18 by elastic restoring force of an extent which prevents, the piece 22 to be mounted after, from falling out while the vehicle is travelling. In this state in which the piece 22 to be mounted after is mounted to the bottom surface side of the design hole 18, gaps 26 for cooling having a predetermined dimension are formed between a design surface 22A of the piece 22 to be mounted after and the bottom end of the peripheral wall 18A of the design hole 18.

Next, the operation and effects of the present first embodiment will be described.

The wheel cap main body 16 and the pieces 22 to be mounted after are manufactured separately. The piece 22 to be mounted after is pressed against the reverse surface side of the design hole 18 of the wheel cap main body 16. By elastically anchoring all of the engaging claws 24 on the peripheral wall 18A of the design hole 18, the piece 22 to be mounted after is mounted to the bottom surface side of the design hole 18 of the wheel cap main body 16, and the wheel cap 10 is formed.

When the wheel cap 10 which is structured as described above is mounted to the outer-side side surface of the steel wheel 14, the punched holes 20 formed in the steel wheel 14 are concealed by the pieces 22 to be mounted after. Thus, a wheel portion 14A (see FIG. 1) which includes the punched holes 20 is not exposed to the exterior through the design holes 18. Accordingly, even if the design holes 18 are made to be large, the appearance of the vehicle is not deteriorated.

Moreover, in the present first embodiment, at the stage of forming the wheel cap 10, the gaps 26 for cooling, which allow air flow to/from the steel wheel 14, are formed between the piece 22 to be mounted after and the bottom end of the peripheral wall 18A of the design hole 18 of the wheel cap main body 16. Thus, even if the pieces 22 to be mounted after are provided at the bottom surface sides of the design holes 18, the function of cooling the steel wheel 14 is ensured.

In accordance with the wheel cap 10 relating to the present first embodiment, even if the design holes 18 are formed to be large, the appearance of the vehicle is not deteriorated, and further, the function of cooling the steel wheel 14 can be ensured.

Moreover, in the case of the wheel cap 10 relating to the present first embodiment, the wheel cap main body 16 and the pieces 22 to be mounted after are manufactured separately. Thus, the configuration of the mold for producing the wheel cap main body 16 is simple. As a result, the cost of the mold, and accordingly, the manufacturing costs, can be reduced. Further, because the configuration of the mold is simple, the flowability of the resin material is good and defective products are less likely to produced, which is advantageous.

Second Embodiment

Next, a second embodiment will be described with reference to FIGS. 3 and 4. Note that this second embodiment also corresponds to the embodiment of the present invention recited in claim 1. Structural portions which are the same as those of the previously-described embodiment are denoted by the same reference numerals, and description thereof is omitted.

Figure 3:
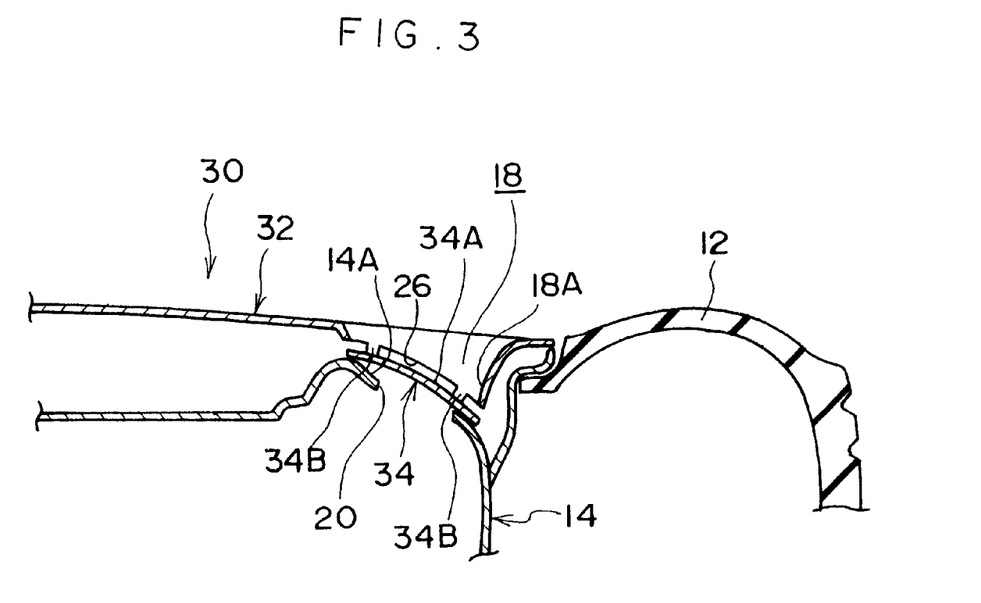
FIG. 3 is a longitudinal sectional view showing a state in which a wheel cap relating to a second embodiment is mounted to a steel wheel.
Figure 4:
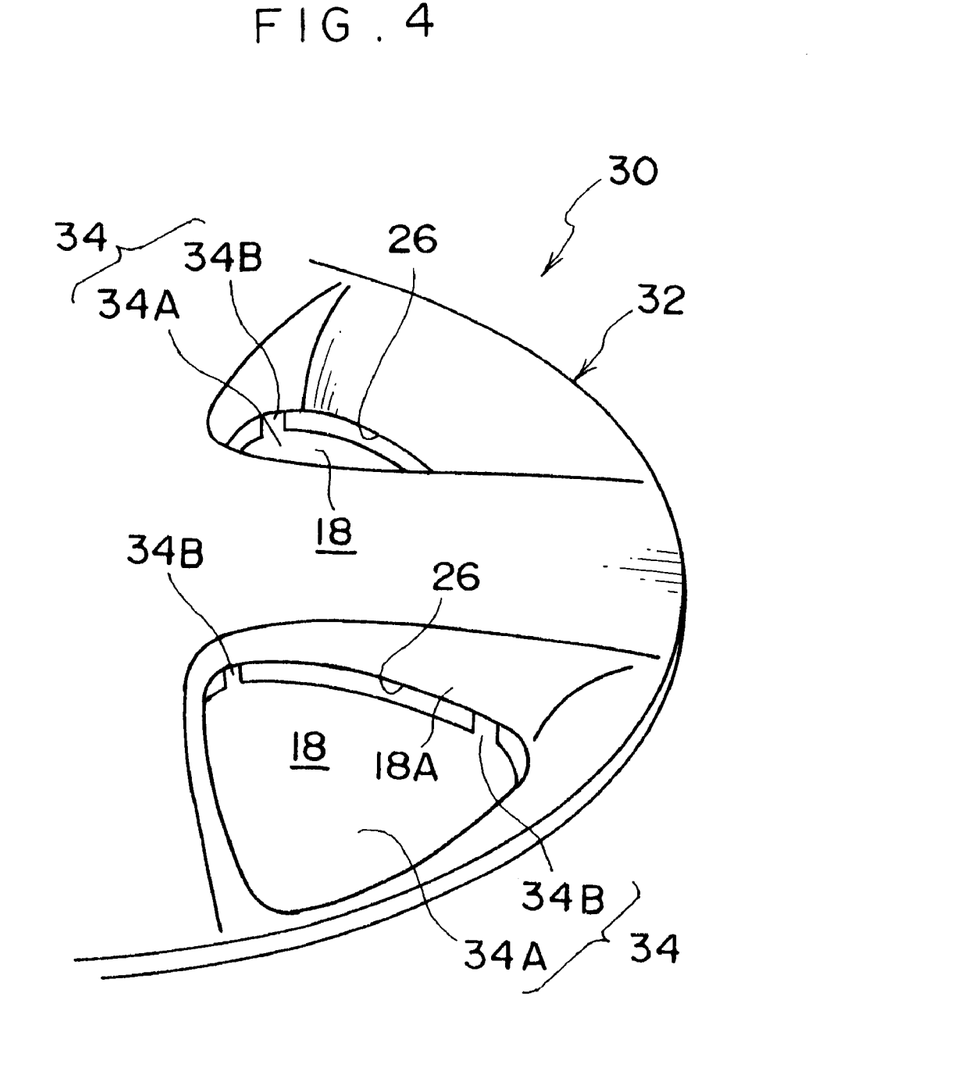
FIG. 4 is a perspective view of the wheel cap shown in FIG. 3.

As can be seen from FIGS. 3 and 4, a wheel cap 30 relating to the present second embodiment has the feature that all of the portions thereof are formed integrally (i.e., the wheel cap 30 is formed as a single part). More specifically, the wheel cap 30 is formed by a wheel cap main body 32 in which the plurality of design holes 18 are formed, and concealing portions 34 formed integrally with the wheel cap main body 32 at the bottom surface sides thereof such that the respective concealing portions 34 cover and thus conceal the design holes 18. The concealing portion 34 is formed by a concealing portion main body 34A, which is formed in a substantially triangular shape which is similar to the piece 22 to be mounted after of the above-described first embodiment, and a plurality of leg portions 34B which stand erect at the peripheral portion of the concealing portion main body 34A at appropriate intervals and are connected to the bottom end of the peripheral wall 18A of the design hole 18.

Due to the concealing portion main body 34A being disposed via the plurality of leg portions 34B, the gaps 26 for cooling having a predetermined dimension are formed between the concealing portion main body 34A and the bottom end of the peripheral wall 18A of the design hole 18.

In accordance with the above-described structure of the second embodiment, the same operation and effects as those of the above-described first embodiment are obtained. Namely, in accordance with the wheel cap 30 of the present second embodiment as well, when the wheel cap 30 is mounted to the outer-side side surface of the steel wheel 14, the punched holes 20 formed in the steel wheel 14 can be concealed by the concealing portions 34. Thus, the wheel portion 14A, which includes the punched holes 20, is not exposed to the exterior from the design holes 18. Accordingly, even if the design holes 18 are formed to be large, the appearance of the vehicle is not deteriorated. Moreover, the gaps 26 for cooling, which allow air flow to/from steel wheel 14, are formed between the concealing portion main body 34A and the bottom end of the peripheral wall 18A of the design hole 18. Thus, even if the concealing portions 34 are provided at the bottom surface sides of the design holes 18, the function of cooling the steel wheel 14 can be ensured. In this way, in accordance with the wheel cap 30 relating to the present second embodiment, even if the design holes 18 are made large, the appearance of the vehicle is not deteriorated, and the performance of cooling the steel wheel 14 can be ensured.

In the case of the wheel cap 30 relating to the present second embodiment, the concealing portions 34 are formed integrally with the wheel cap main body 32. Thus, the number of parts can be reduced, and assembly operations for mounting the concealing portions 34 to the wheel cap main body 32 are not needed.

Moreover, in the case of the wheel cap 30 relating to the present second embodiment, as the concealing portions 34 are formed integrally with the wheel cap main body 32, there is of course no fear that the concealing portions 34 will fall off while the vehicle is traveling. In addition, the concealing portions 34 do not joggle, and no noise due to joggling arises.

In the case of the wheel cap 30 relating to the present second embodiment, the degree of the supporting rigidity of the concealing portion main bodies 34A with respect to the wheel cap main body 32, and the degree of the performance of cooling the steel wheel 14 can be set arbitrarily by adjusting the widths and the lengths of the leg portions 34B of the concealing portions 34.

Third Embodiment

Next, a third embodiment will be described with reference to FIGS. 5 through 7. Note that this third embodiment corresponds to the embodiment of the present invention recited in claim 2. Structural portions which are the same as those of the above-described embodiments are denoted by the same reference numerals, and description thereof is omitted.

Figure 5:
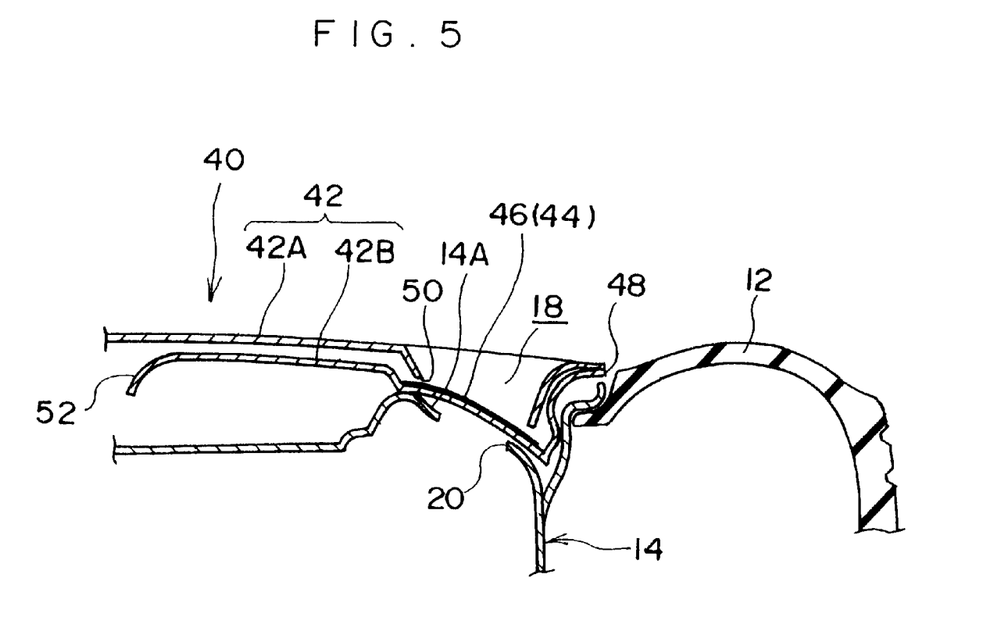
FIG. 5 is a longitudinal sectional view showing a state in which a wheel cap relating to a third embodiment is mounted to a steel wheel.
Figure 6:
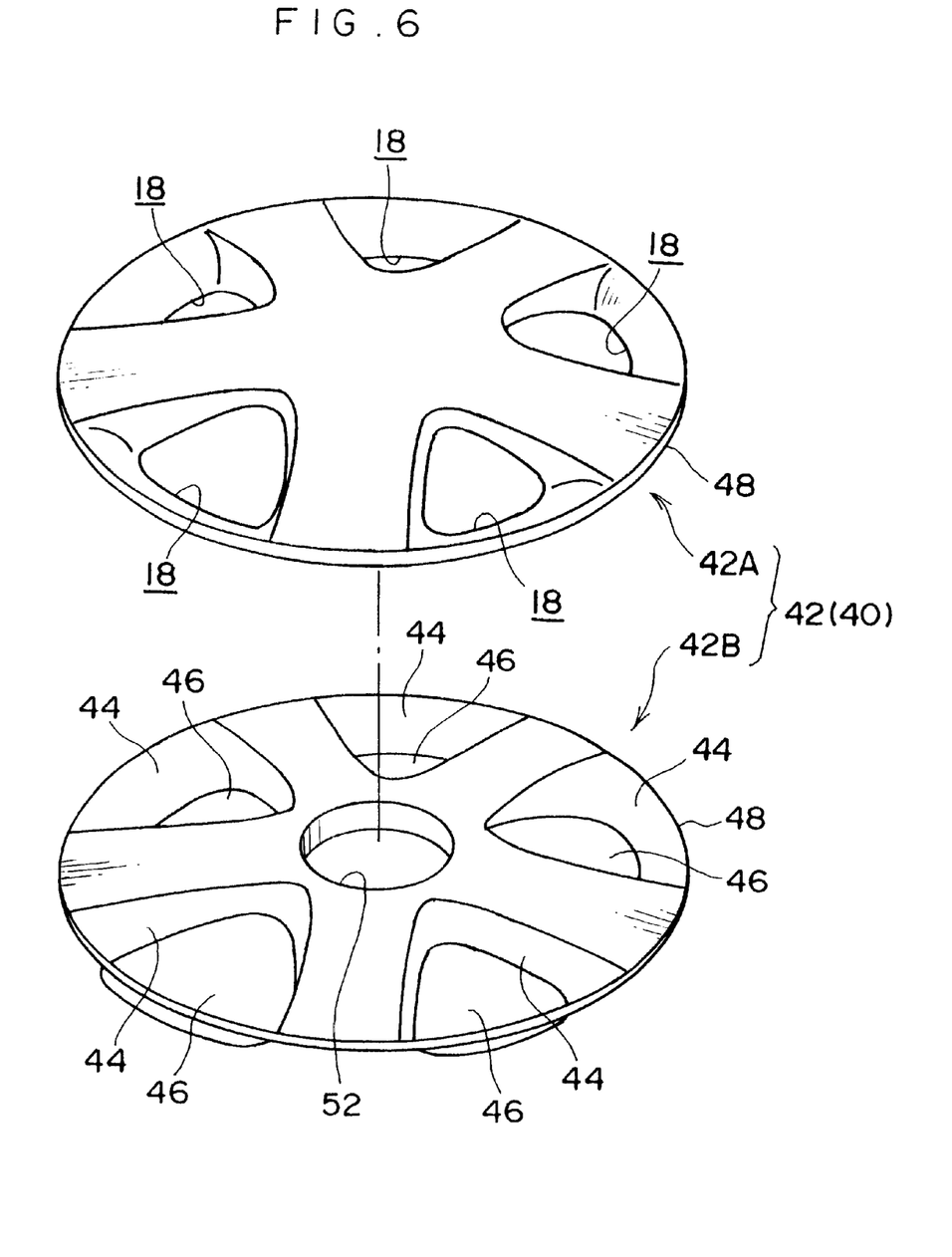
FIG. 6 is a perspective view showing a state in which an outer side wheel cap main body and an inner side wheel cap main body, which form the wheel cap shown in FIG. 5, are separated.
Figure 7:
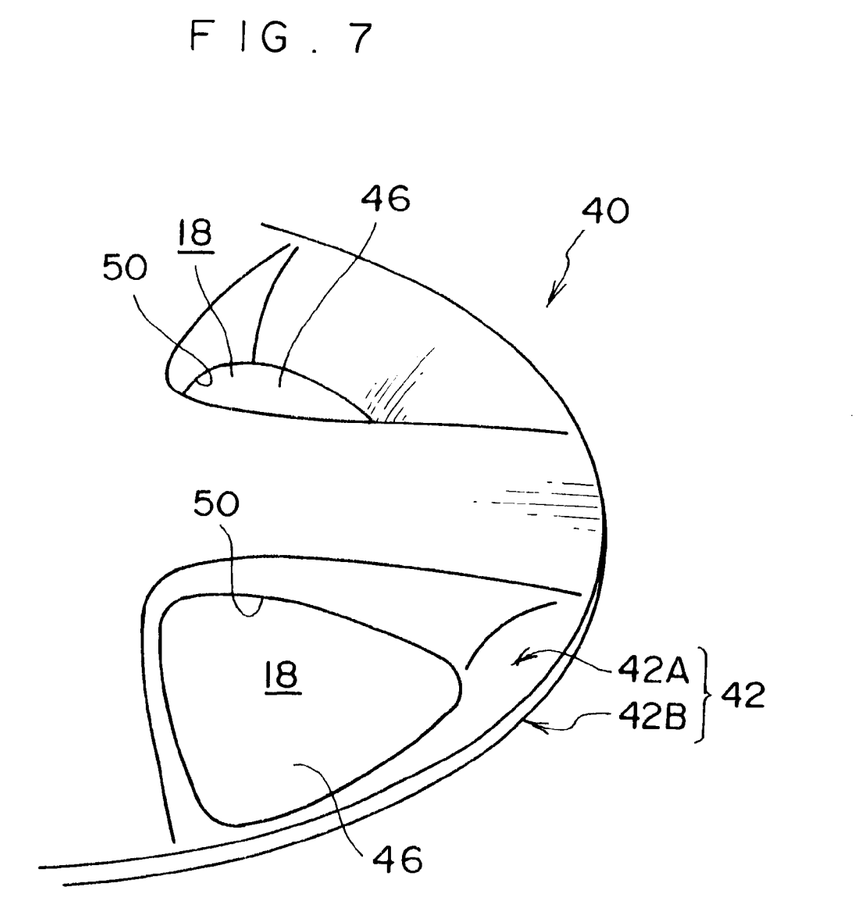
FIG. 7 is a perspective view showing a state in which the wheel cap is formed by the outer side wheel cap main body being welded to the inner side wheel cap main body shown in FIG. 6.

As shown in FIGS. 5 through 7, a wheel cap 40 relating to the present third embodiment differs from the above-described first and second embodiments in that a wheel cap main body 42 is divided into two portions which are an outer side wheel cap main body 42A and an inner side wheel cap main body 42B. This point is the unique feature of the present third embodiment.

More specifically, the plurality of design holes 18 are formed at predetermined intervals in the peripheral direction in the outer side wheel cap main body 42A which forms one portion of the wheel cap (main body) 40. On the other hand, concave portions 44, whose configurations are similar to those of the design holes 18, are formed, at positions corresponding to the design holes 18, in the inner wheel cap main body 42B which forms the other portion of the wheel cap (main body) 40. The bottom surfaces of the concave portions 44 are painted black so as to form black painted portions 46 which serve as "concealing portions". Note that the color of the paint is not limited to black, and may be any color. Further, resin claws (not shown) are formed at the peripheral portion of the inner side wheel cap main body 42B, such that the wheel cap 40 can be elastically mounted to the outer-side side surface of the steel wheel 14.

In the state in which the outer side wheel cap main body 42A is fit on and partially covers the outer side of the inner side wheel cap main body 42B, outer peripheral portions 48 of both the outer side wheel cap main body 42A and inner side wheel cap main body 42B are welded together along the entire peripheries thereof. In the state in which the outer side wheel cap main body 42A and inner side wheel cap main body 42B are welded together and made integral, gaps 50 for cooling having a predetermined dimension are formed between the bottom ends of the peripheral walls 18A of the design holes 18 and the black painted portions 46. Moreover, circular openings 52 for cooling are formed at the central portion of the inner side wheel cap main body 42B. As a result, air paths for cooling are formed between the air environment outside of the outer side wheel cap main body 42A and the steel wheel 14.

Next, the operation and effects of the present embodiment will be described.

First, the outer side wheel cap main body 42A is fit on so that the outer side wheel cap main body 42A partially covers the outer side of the inner side wheel cap main body 42B. Then, in this state, the outer peripheral portions 48 of the paired wheel cap main bodies are welded together along the entire peripheries thereof. In this way, the outer side wheel cap main body 42A and the inner side wheel cap main body 42B are made integral, and the wheel cap main body 42, and thus the wheel cap 40, is formed.

When the wheel cap 40 structured as described above is mounted to the outer-side side surface of the steel wheel 14, the punched holes 20 formed in the steel wheel 14 are concealed by the black painted portions 46 of the recess portions 44 of the inner side wheel cap main body 42B. Thus, the wheel portion 14A, which includes the punched holes 20, is not exposed to the exterior from the design holes 18. Accordingly, even if the design holes 18 are made large, the appearance of the vehicle is not deteriorated.

Further, in the present third embodiment, in the stage when the wheel cap 40 is formed, the gaps 50 for cooling are formed between the bottom ends of the peripheral walls 18A of the design holes 18 of the outer side wheel cap main body 42A and the black painted portions 46 of the inner side wheel cap main body 42B. As a result, air paths for cooling, which allow air flow to/from the steel wheel 14, are formed via the gaps 50 and the openings 52 for cooling, which openings 52 are formed in the central portion of the inner side wheel cap main body 42B. Thus, in spite of the provision of the black painted portions 46 at the bottom surface sides of the design holes 18, the function of cooling the steel wheel 14 is reliably ensured.

In this way, in accordance with the wheel cap 40 relating to the present third embodiment, in the same way as in the above-described first embodiment, the appearance of the vehicle is not deteriorated even if the design holes 18 are made large. Further, in accordance with the wheel cap 40, the performance of cooling the steel wheel 14 can be reliably ensured.

In the case of the wheel cap 40 relating to the present third embodiment, the black painted portions 46 which serve as concealing portions are formed integrally with the inner side wheel cap main body 42B. The inner side wheel cap main body 42B and the outer side wheel cap main body 42A are made integral by welding. Accordingly, joggling of the black painted portions 46 while the vehicle is traveling and the generation of noise due to such joggling can be reliably prevented.

Moreover, in the case of the wheel cap 40 relating to the present third embodiment, the design holes 18 are provided in the outer side wheel cap main body 42A. The black painted portions 46, which serve as the concealing portions, and the openings 52 for cooling are provided at the inner side wheel cap main body 42B. Namely, the necessitated functions are borne both by the outer side wheel cap main body 42A and the inner side wheel cap main body 42B. Thus, as compared with the second embodiment in which all of the functions are concentrated at a single member, it is possible to significantly increase the rigidity of the wheel cap 40 itself. Accordingly, breakage and the like are less likely to occur, and the durability can be improved.

In the above description, the outer peripheral portions 48 of the outer side wheel cap main body 42A and the inner side wheel cap main body 42B are fixed together by welding. However, any fixing means can be utilized provided that the outer side wheel cap main body 42A and the inner side wheel cap main body 42B can be made integral. For example, resin engaging claws can be provided at plural positions of the outer side wheel cap main body 42A, and portions-to-be-engaged, such as engagement holes or the like, which correspond to the engaging claws can be provided at the inner side wheel cap main body 42B. By fitting the outer side wheel cap main body 42A onto the inner side wheel cap main body 42B, the engaging claws can elastically engage the portions-to-be-engaged, such that the outer side wheel cap main body 42A and the inner side wheel cap main body 42B can be made integral. Or, the engaging claws of the outer side wheel cap main body 42A can be formed to be long, so that, in a state in which the outer side wheel cap main body 42A is fit on the inner side wheel cap main body 42B (i.e., in the state in which the two are superposed), this integrated structure can be engaged (mounted) to the side surface of the steel wheel in a single operation.

In the above-described embodiments, the wheel caps 10, 30, 40 are mounted to the steel wheel 14. However, the "wheel" in the present invention encompasses wheels other than the steel wheel 14. Namely, although it is basically supposed that the resin wheel caps 10, 30, 40 are mounted onto the steel wheel 14, the wheel caps 10, 30, 40 relating to the embodiments may also be mounted to aluminum wheels or the like.

In each of the above-described embodiments, the design holes 18 are formed in substantially triangular configurations. However, the present invention is not limited to the same, and is applicable design holes of any of various configurations.

As described above, the wheel cap structure relating to the present invention has the excellent effects that, even if the design holes are made large, the appearance of the vehicle is not deteriorated, and further, the performance of cooling the wheel can be ensured.

What is claimed is:

1. A wheel cap structure comprising:

a wheel cap main body mounted to a side surface of a wheel, and in which a plurality of design holes are formed in a peripheral direction of the wheel cap main body; and concealing portions provided respectively at opening portions of the design holes of the wheel cap main body, the concealing portions concealing a wheel portion beneath the design holes, and gaps for cooling, which allow air flow to/from a wheel, being formed between the concealing portions and the wheel cap main body.

2. A wheel cap structure comprising:

a wheel cap main body mounted to a side surface of a wheel, and in which a plurality of design holes are formed in a peripheral direction of the wheel cap main body; and concealing portion pieces formed in configurations which substantially match configurations of the design holes, the concealing portion pieces having, at peripheral portions thereof, hook-shaped engaging claws which are elastically deformable, wherein the concealing portion pieces are mounted to opening portions of the design holes of the wheel cap main body due to the engaging claws of the concealing portion pieces engaging reverse surface sides of peripheral walls of the design holes while the engaging claws are elastically deformed, and as a result, a wheel portion, which is positioned beneath the design holes, is concealed by the concealing portion pieces, and at least one gap for cooling, which allows air flow to/from the wheel, is formed between the concealing portion pieces and the wheel cap main body.

3. The wheel cap structure of claim 2, wherein an air path, which runs from an outside air environment to the wheel, is formed through the gap for cooling.

4. A wheel cap structure mounted on a side surface of a wheel, comprising:

a wheel cap main body in which a plurality of design holes are formed in a peripheral direction of the wheel cap main body; and concealing portions formed integrally with the wheel cap main body at opening portions of the design holes of the wheel cap main body, so as to conceal a wheel portion beneath the the design holes, wherein the concealing portion is formed from:
a concealing portion main body which forms a bottom portion having a configuration which substantially matches a configuration of the design hole; and
a plurality of leg portions are provided at a peripheral portion of the concealing portion main body, and connected to a peripheral wall of the design hole, and paths for cooling are formed by the leg portions between the concealing portion main body and the peripheral wall of the design hole.

5. The wheel cap structure of claim 4, wherein an interior of a wheel and an outside air environment communicate through the paths for cooling.

6. A wheel cap structure comprising:

an outer side wheel cap main body forming one portion of a wheel cap main body, and in which a plurality of design holes are formed in a peripheral direction of the outer side wheel cap main body; and an inner side wheel cap main body forming another portion of the wheel cap main body and mounted to a side surface of a wheel, the outer side wheel cap main body being fit with and partially covering the inner side wheel cap main body, wherein the inner side wheel cap main body has:

concealing portions which, in a state in which the outer side wheel cap main body is fit with and partially covers the inner side wheel cap main body, block opening portions of the design holes so as to conceal the wheel, and which form gaps for cooling between the concealing portions and the outer side wheel cap main body; and openings for cooling formed at positions which are different than the concealing portions, and allowing air flow to/from the wheel.

7. The wheel cap structure of claim 6, wherein the outer side wheel cap main body and the inner side wheel cap main body are fixed integrally in a state in which the outer side wheel cap main body is fit with and covers the inner side wheel cap main body.

8. The wheel cap structure of claim 6, wherein the openings for cooling are formed at a central portion of the wheel cap main body.

9. The wheel cap structure of claim 6, wherein air paths, which run from an outer air environment to the wheel, are formed through the gaps for cooling and the openings for cooling.

* * * * *